May 12, 1925.                                                    1,537,634
H. E. WATSON
ROAD MAP
Filed July 26, 1923                    2 Sheets-Sheet 1

Inventor
Hazen E. Watson
By Stuart C. Barnes
Attorney

May 12, 1925.

H. E. WATSON

ROAD MAP

Filed July 26, 1923

Inventor
Hazen E. Watson

By Stuart C Barnes
Attorney

Patented May 12, 1925.

1,537,634

UNITED STATES PATENT OFFICE.

HAZEN E. WATSON, OF DETROIT, MICHIGAN.

ROAD MAP.

Application filed July 26, 1923. Serial No. 653,856.

*To all whom it may concern:*

Be it known that I, HAZEN E. WATSON, a citizen of the United States, residing at Detroit, in the county of Wayne and State of Michigan, have invented certain new and useful Improvements in Road Maps, of which the following is a specification.

This invention relates to loose leaf guide road maps. It is the object of the present invention to provide a road map which may be conveniently and easily handled by the automobile tourist while driving. It has been the general custom to provide road maps in the form of large folded sheets of paper which are exceedingly hard to handle in the course of travel, especially when the car is in motion.

It is the purpose of the present invention to provide a map which may be drawn on a large scale, but which is cut up into sections which have a universal adaptability in joining them together in line, that is, they may be joined together with any desired edge of one map section meeting any desired edge of the adjacent map section, as will be more fully explained hereinafter.

Another feature of the invention is the provision of a map of cities on the back of the section which gives the tourist a guide through cities or towns contained in the territory covered by the section. This is a very great help to him as almost any tourist has had considerable confusion in picking his way through the streets of a large city and finding the appropriate road out of the city to his destination.

Information of value to tourists will be included either on the backs of some of the maps or on separate sheets. This information will relate to hotels, garages and camp sites; motor laws, customs regulations, ferry service and such other information as may seem advisable. An index to towns showing population and location may also be included. Loose leaf sheets showing a mileage log between towns may be included for the main traveled routes or where it is desired to augment the utility of the map. A loose leaf service showing detours and conditions of roads may be supplied at stated intervals so that the tourist may keep his book up to date. Additional leaves may be supplied which carry advertising matter.

Figure 1:
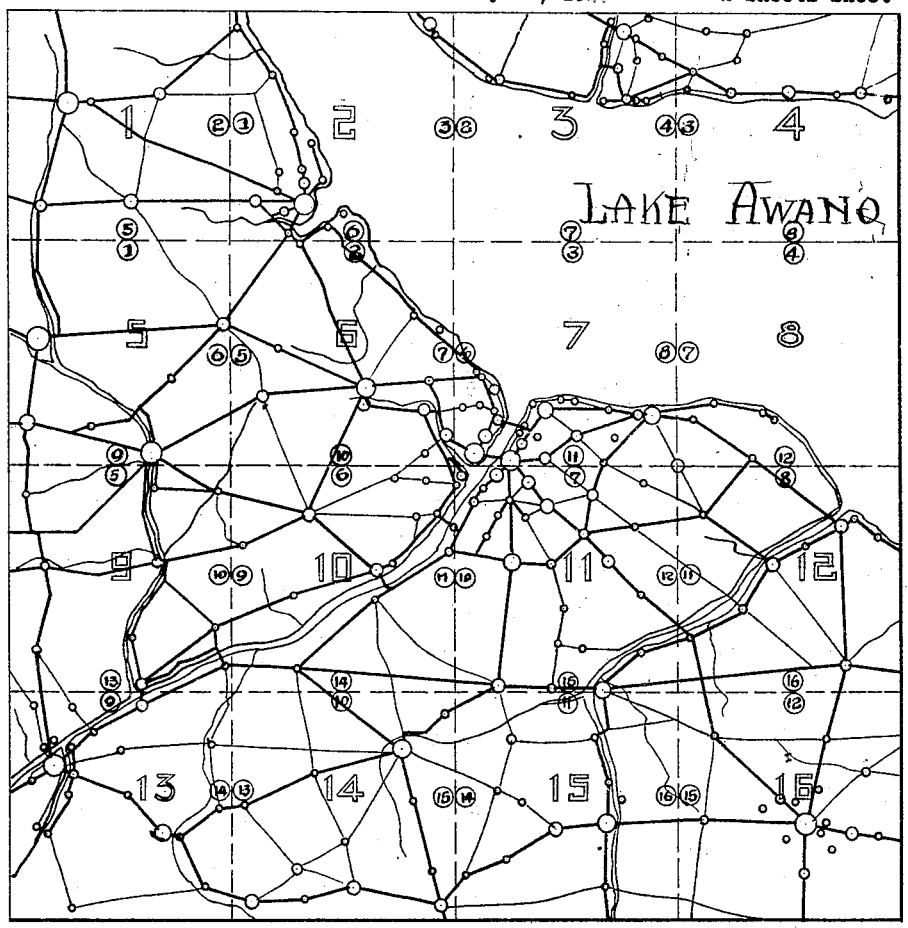
Fig. 1 is a large scale map of a given territory, showing how the same may be cut up into sections for convenient handling.
Figure 2:
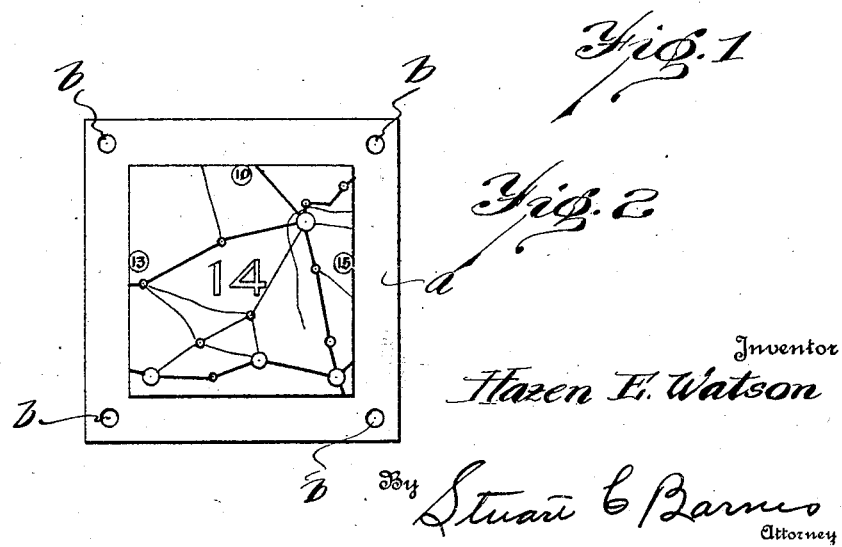
Fig. 2 shows one of these sections pasted or glued to a linen or cloth backing.
Figure 3:
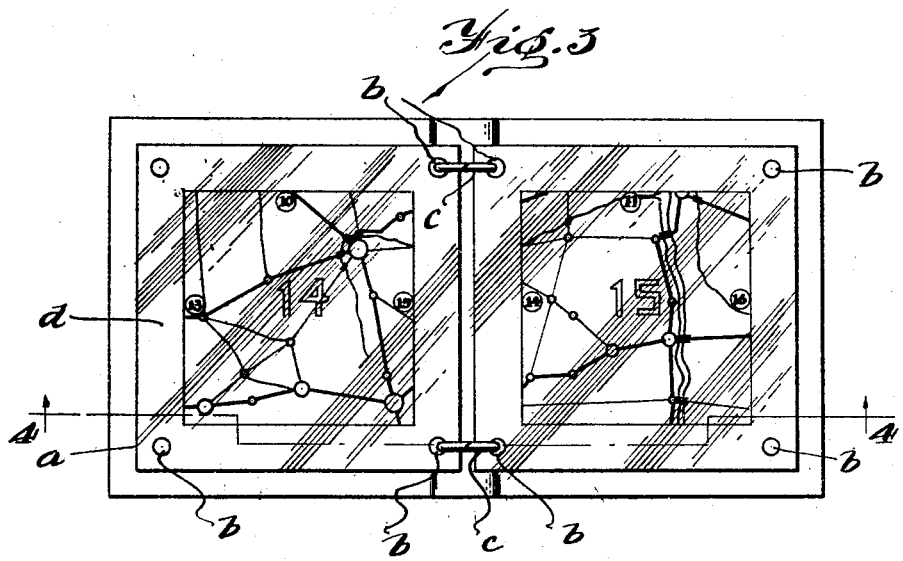
Fig. 3 shows how the pages may be arranged in line in the loose leaf binder.

Any given section of territory may be contained in a map of large scale, which enables the roads to be plainly shown so that they may be easily followed by the driver. These subdivisions of territory are for convenience numbered consecutively, and each subdivision is numbered along the edge to correspond with the number of the section adjacent to that edge as clearly shown in Fig. 1. The map of the sections is pasted or glued to suitable backing, designated *a*, which may be linen, cloth or any other suitable material. These backings are perforated at the corners by the perforations *b*, which enables the prongs *c* of the loose leaf binder to be run through the perforations. These map sections are all square. On the reverse side of the map section may be embodied one or more maps of cities contained in the territory represented on the face of the map, or other matter of interest to the tourist.

These map sections may be sold in large numbers. A certain given number may represent a certain given political section, such for instance, as the State of Michigan, or they may be sold in a certain number of sections to represent a given group of States, such as the Atlantic States, New England, or any other division or territory, may be used as a unit for the sale of a plurality of these sections.

Now, it will be obvious that the person proposing a tour can sit down and lay out his tour before him in proper sequence in the book. For instance, if he is going from Detroit to Chicago directly across the State of Michigan; he can lay out sections in sequence, east or west, so that by simply turning over the pages he will have the route in one continuous line before him. He may do precisely the same thing when traveling north,—say from Detroit to Bay City. These sections have a universal adaptability for positioning in the book. I use the word "universal" in the sense that all four sides of the map are available for positioning in adjacency to another section. It will also be evident that even though the course may change the direction or go in an oblique line, the sequence of the route will be uninterrupted from page to page.

It will be obvious that this plan permits the use of a large scale map very conveniently by the tourist. He may carry the loose leaf binder in his lap and no difficulty is experienced in the wind tearing the paper or difficulty in handling or referring to any given position on the map. It lies directly before the tourist in a form such as permits it to be easily and quickly handled.

Figure 4:
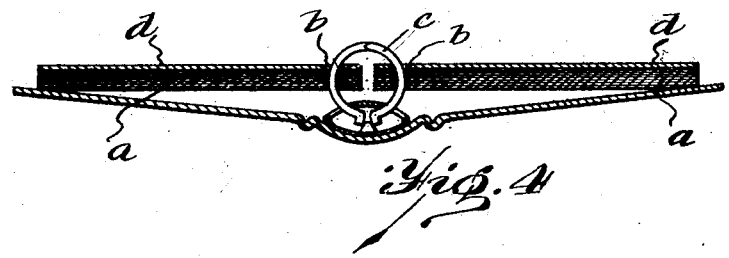
Fig. 4 is a cross section through the binder.
Figure 5:
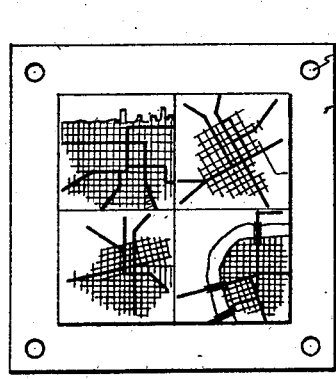
Fig. 5 illustrates the reverse side of one of the pages.

I have also provided transparent celluloid leaves $d$, that can be inserted in the book so as to cover the maps as shown in Fig. 4, which will protect the map from rain. These transparent leaves may be only two in number and are changed whenever the tourist turns a page or the book may be supplied with a transparent leaf between each page so as to do away with changing at every turn of the page.

What I claim is:

1. In a road guide, a loose leaf binder, a plurality of interchangeable and rotatable sections and means for securing said sections in said binder whereby the sections can be arranged in any desired sequence or any desired side to side position to lay out a route.

2. In a road guide, the combination of a loose leaf binder, and a plurality of square map sections provided with means whereby the sections may be secured in the binder and have a universal adaptability for arrangement in sequence for laying out a route.

3. In a road guide, a loose leaf binder, and a plurality of interchangeable large scale square map sections provided with means whereby the sections may be secured in the binder and have a universal adaptability for arrangement in sequence from side to side to lay out a route.

4. In a road guide, a loose leaf binder, and a plurality of large scale, suitably mounted square map sections provided with means whereby the sections may be secured in the binder and have a universal adaptability to be laid out in sequence to provide a route.

5. In a road guide, a loose leaf binder, and a plurality of map sections provided with means whereby they can be secured and arranged in interchangeable order in the binder and in succession to provide a route, some of said sections provided on their reverse sides with a map of one or more cities contained in the territory represented on the face of the section.

6. In a road guide, a loose leaf binder, and a plurality of square, large scale map sections provided with means whereby they can be secured interchangeably in position in the binder, both as regards sequence of arrangement in the map sections and also in the side of the map section clinched by the binder, whereby a route may be laid out in sequence in the binder.

7. In a road guide, the combination of a plurality of map sections provided with means which permits them to bound together both interchangeable in position and rotatable to bring any one of its sides to a given position, and means for temporarily binding them together in a set position of rotation or interchangeability for laying out a route in proper sequence.

8. In a road guide, the combination of a plurality of map sections provided with means permitting their positions to be interchanged, some of the map sections having on the reverse sides maps of cities contained within such territory as is represented on its face, and means for temporarily binding said sections together so that a route may be laid out in proper sequence.

9. In a road map, a loose leaf binder, a plurality of square map sections, and means for temporarily binding the said sections in the loose leaf binder in any one of four positions, whereby a proposed route may be laid out in the proper sequence.

In testimony whereof I affix my signature.

HAZEN E. WATSON